Jan. 2, 1968

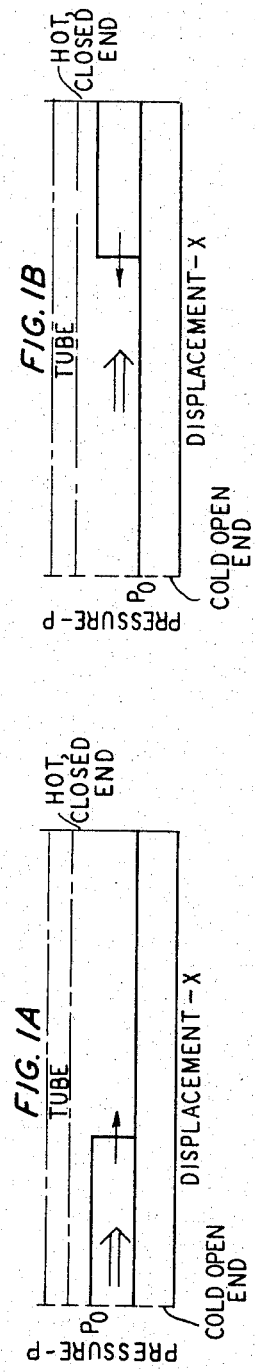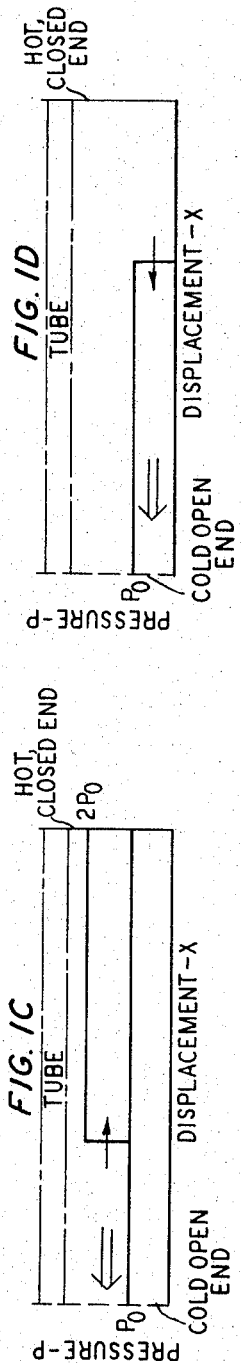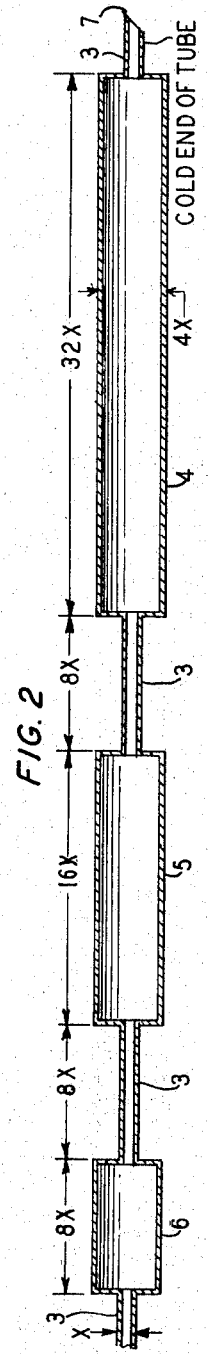

J. L. PERRY 3,360,948

PREVENTION OF THERMAL OSCILLATIONS
IN CRYOGENIC FLUIDS

Filed Oct. 24, 1965

INVENTOR
JAMES L. PERRY
BY

ATTORNEY

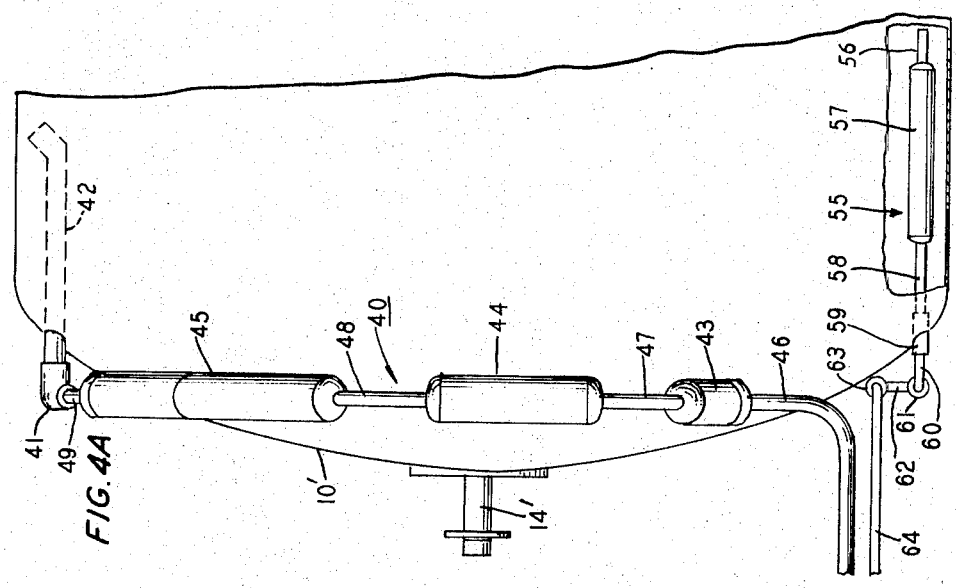
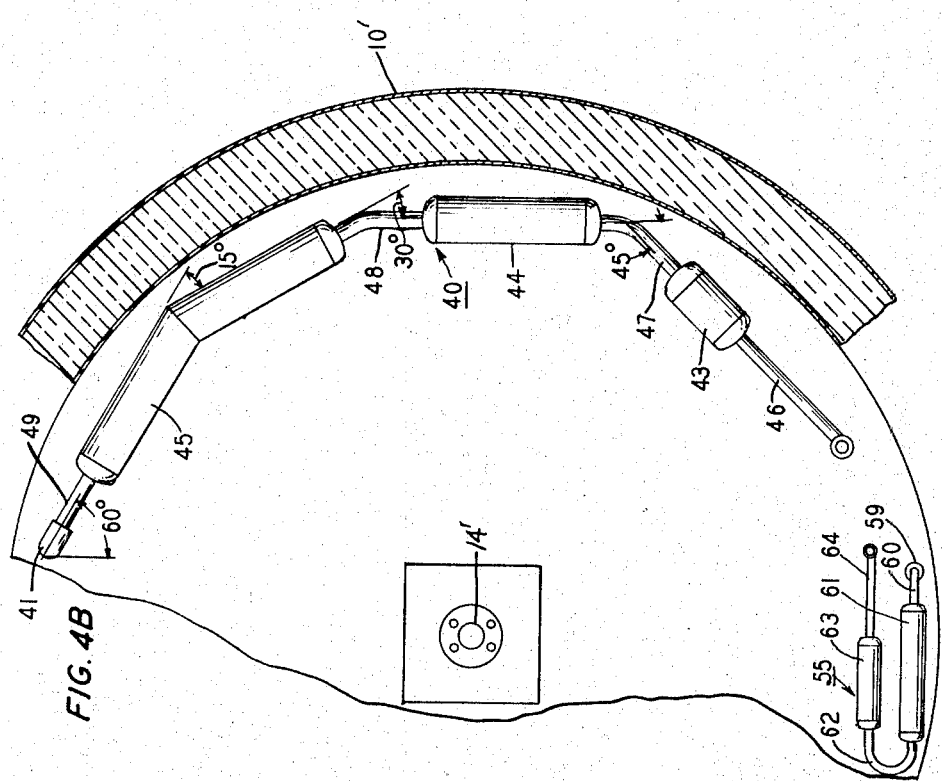

United States Patent Office 3,360,948
Patented Jan. 2, 1968

3,360,948
PREVENTION OF THERMAL OSCILLATIONS IN CRYOGENIC FLUIDS
James L. Perry, Totowa, N.J., assignor to Air Reduction Company, Incorporated, New York, N.Y., a corporation of New York
Filed Oct. 24, 1965, Ser. No. 504,720
8 Claims. (Cl. 62—55)

ABSTRACT OF THE DISCLOSURE

In a cryogenic system, a conduit for transferring fluids between a highly insulated storage chamber and a warmer environment which is designed to suppress thermal oscillations arising in the conduit when the access valve is closed. Interposed at spaced intervals along the conduit are a plurality of hollow pressure accumulators, of graduated cubical content, which increase in length in the direction of the cold end of the conduit. In a preferred embodiment, the conduit inserted into the storage tank is at least partially insulated, and comprises three accumulators in the form of hollow cylinders, separated from one another by pipe sections 8X long, where X is the pipe cross-section. The accumulators are 4X in diameter, and respectively 8X, 16X, and 32X in length.

---

Figure 3:
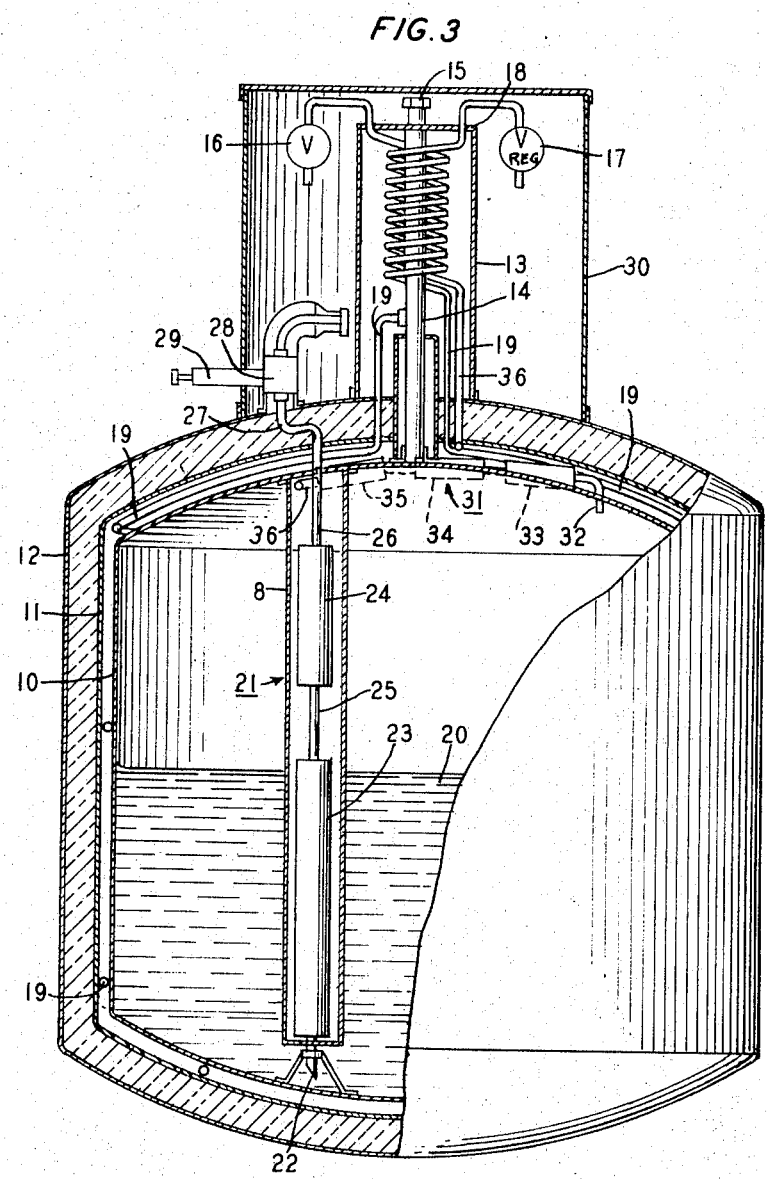

This invention relates in general to the prevention of heat leaks in cryogenic storage systems, and more particularly, to the suppression of thermal pressure oscillations in conduits connected to such systems.

In the storage of cryogenic liquids, such as helium, which are characterized by low viscosity and low heat of vaporization, one of the principal concerns is to prevent heat from leaking into the storage container. One of the causes of heat leak in such systems is the generation of thermal pressure oscillations, which arise spontaneously in connecting lines leading from the inner container of the storage system, especially when the temperature gradient along such lines is steep, and the line is closed at the outer or warmer end. The magnitude of the problem caused by thermal oscillations will be apparent from the fact that they have been known to cause increases of up to a thousandfold in the heat leak in cryogenic systems. Moreover, they pose a safety hazard, since high intensity oscillations may build up and lead to explosions of the cryogenic systems.

Although thermal pressure oscillations have been known in the art for many years, prior art methods of reducing or eliminating them have not been successful, or practical for commercial applications. These have included reducing the temperature gradient along the tube by increasing the length-to-diameter ratio, drilling a small hole in the upper part of the tube, using concentric tubes or a plurality of parallel tubes, placing a brass ring near the cold end of the tube, inserting a central rod and a series of mechanical resistance elements into the tube to change its inner diameter, thereby to tune out certain unwanted frequencies, or dropping small spherical lead pellets into the tube, in an attempt to break up the oscillating wave-fronts.

Accordingly, it is a principal object of the present invention to reduce the heat leaks in cryogenic systems, more particularly, by greatly reducing or actually eliminating thermal pressure oscillations in conduits of such systems.

In accordance with the present invention, the aforesaid object has been successfully accomplished by fashioning the conduits connected to an insulated cryogenic container to include a plurality of enlargements, hereinafter called "accumulators," of which the cross-sectional dimensions are substantially increased with reference to the general cross-sectional dimension of the conduit. More particularly, each of the above-described accumulators is dimensioned to have a different cubic content in order to neutralize any possibility of resonance to oscillations of any frequency and amplitude. It has been further discovered in accordance with the present invention that for optimum effect in reducing thermal oscillations, the accumulators are spaced apart, and are graduated in size, the largest chamber being located adjacent to the cold end of the conduit.

A preferred embodiment of the present invention employs a conduit in which are disposed three accumulators, comprising hollow cylinders, the ends of which are concentrically connected by lengths of the conduit. Each cylinder has a diameter 4X, where X is the general diameter of the conduits; and their respective lengths are 32X, 16X, and 8X, the largest being located at the cold end. Each pair of accumulators is separated by a length of conduit equal to 8X. The aforesaid proportions are applicable to conduit tubes ranging in diameter from less than $\frac{1}{32}$ in. to more than 2 in., in each case, greatly reducing or eliminating the thermal oscillations when applied to the conduits of a cryogenic system.

It is contemplated, in accordance with the present invention, that in an insulated tank of cryogenic fluid, such as, for example, liquid helium or hydrogen, one or more systems of accumulators can be employed, particularly in the lines adapted to withdraw liquid and gas from the tank. For example, the vent line may include a gas-tight conduit having two or three accumulators, which are proportioned as described in the foregoing paragraph. This is extended nearly to the bottom of the tank in a position substantially parallel to the vertical axis of the tank. When the principal valve attached to this line is closed, the accumulators prevent the setting up of thermal oscillations in the line. Likewise, a series of accumulators may be inserted, with similar effect, in a liquid withdrawal line, or in one or more auxiliary lines connected to the tank for discharging gas, or other purposes.

It will be apparent from the description hereinafter that the systems of accumulators may take various forms and configurations, in order to meet specific requirements.

In each case, it will be apparent to those skilled in the art that the systems of accumulators, as described in accordance with the present invention have the advantage of substantially reducing heat leak and hazard in cryogenic systems.

Other objects, features, and advantages of the present invention will be apparent to those skilled in the art from a study of the attached drawings, in which:

FIGURES 1A, 1B, 1C, 1D, and 1E are graphical representations employed in an explanation of the nature of thermal oscillations;

FIGURE 2 is a showing, in longitudinal section, of a system of accumulators proportioned in accordance with the teachings of the present invention;

FIGURE 3 shows, in cut-away section, an insulated cryogenic storage tank including gas and liquid lead-out lines each fashioned to include a system of accumulators in accordance with the present invention; and FIGURES 4A and 4B are longitudinal and cross-sectional showings, respectively, of a portion of the inner tank of a cryogenic storage system including gas lead-out lines, with accumulators in accordance with the present invention, which are fashioned in different configurations to fit into the contour of the tank.

It was long ago recognized by Lord Rayleigh, and others before him, that when gas is enclosed in a tube, the hot end of which is closed, and the cool end of which is open, spontaneous pressure oscillations may result. This assumes that the temperature gradient between the cold and hot ends of the tube is sufficiently steep, about 15° per in. or greater, and the tube is free to exchange heat with its environment along a good portion of its length, particularly near the hot end.

A possible theoretical explanation of the mechanism of such oscillations is as follows:

It is assumed that the oscillations take the form of pressure waves which travel up and down the tube in a four-stroke cycle, the tube acting as a quarter-wave resonant tube, with a pressure node at the cold, open end, and a pressure anti-node at the warm, closed end.

Referring to FIG. 1A of the drawings, which shows a plot of pressure versus displacement along the tube, a compression wave having an amplitude $p_0$ moves from the cold, open end to the hot closed end of the tube, accelerating the gas through which it moves to a velocity in the direction of propagation, as indicated by the arrows.

At the closed, hot end of the tube, the compression wave is reflected without change in phase, but with doubled amplitude, $2p_0$. It is now moving through gas which has a velocity in the opposite direction, imparting to it an equal and opposite velocity which brings it to rest, as the wave-front moves through.

During these two traverses of the compression wavefront, the gas at the cold, open end of the tube has had a velocity toward the hot, closed end, thereby causing cold gas from the environment to be inducted into the tube.

Referring to FIG. 1C, the compression wave is reflected from the cold, open end of the tube as an expansion wave, thereby undergoing a phase reversal. The latter moves toward the hot, closed end of the tube through gas which is now at rest, reducing the pressure by an amount equal to $p_0$, while accelerating the gas to a velocity opposite in direction to the direction of propagation of the wave, as indicated by the arrows.

Referring to FIG. 1D, the expansion wave is reflected, without change in phase, by the closed, hot end of the tube. As the expansion wave returns to the cold end on the last stroke of the cycle, it again reduces the pressure of the gas by an amount $p_0$, and returns the gas to a condition of rest, by imparting to it a velocity opposite to that sustained in the last traverse.

During the traverses of the expansion wave through the tube, the gas at the cold, open end of the tube has had a velocity out of the tube, exhausting warm air from the tube into the cold reservoir.

From the foregoing description, the heat pumping mechanism produced by the oscillations is evident, as indicated in FIG. 1E of the drawings, which is a plot of the temperature gradients, with and without oscillations in the tube, as shown by curves 1 and 2, respectively. The compression cycle of the oscillation acts as an intake stroke, inducting cold gas into the tube, which, together with gas already present in the tube, moves toward the hot end to receive heat from the warmer sections of the tube. Having received some heat, this now warm gas is exhausted into the cold environment during the expansion part of the cycle.

Most of the driving force is derived while the compression wave moves from the hot to the cold end of the tube, since the gas behind the wave is at rest, absorbing heat from the tube walls which it contacts as it tends to expand. This causes each element of gas to emit second order pressure waves which overtake and augment the main compression wave.

In order for a structure to operate satisfactorily in a cryogenic system, to eliminate or reduce thermal pressure oscillations, it should meet the following criteria:

(1) It should be of simple construction.

(2) It should operate effectively for all liquid levels in the container.

(3) It should be compatible with standard commercial container designs.

(4) It should not lead to an unacceptable pressure drop within the pipe, which would present a substantial flow impedance.

None of the prior art devices for dealing with the problem of thermal pressure oscillations has been found to fulfill the above criteria. It will be noted, particularly, that those prior art devices which are designed as mechanical filter systems, including a central rod and a series of elements disposed at intervals therealong to reduce the internal cross-section of the conduit, are unsuitable for dynamic systems adapted for flowing liquid, because of the substantial flow impedance which they present, contrary to the requirements of criteria (4) listed above.

The technique of the present invention is believed to succeed in eliminating or reducing thermal oscillations in cryogenic systems by imposing a pattern in the nature of an external system of baffles on the connecting conduit, which breaks up or disrupts the traversing wavefronts. When the pressure wave is incident on a discontinuity in the cross-sectional area, part of the wave is transmitted and part reflected, the amount reflected being determined by the size of the change in area.

A typical design for a system of accumulators in accordance with the present invention is shown in longitudinal section in FIG. 2 of the drawings. The illustration shown comprises a tube 3, having an external cross-sectional dimension X of ½ in. and a wall-thickness of 0.030 in., which since it remains the same throughout the structure of FIG. 2, I will neglect in the present discussion.

On the initial ½ in. diameter pipe are imposed successive enlargements 4, 5, and 6, or "pressure accumulators," which are three in number in the present illustration. Each of these has an outer diameter equal to 2 in., which is 4X; and each pair of accumulators is separated by a tube length 3 of 4 in., which is 8X. In the present embodiment, the accumulator lengths are graduated, the longest one 4, located about ½ in. from the cold end of the tube, being 16 in., or 32X; the second or middle accumulator 5 being 8 in., or 16X; and the third accumulator 6, which is located farthest from the cold end, being 4 in. long, or 8X. For practical purposes, the cold terminal end 7 may be mitered, to provide a gas or liquid vent when the tube contacts the bottom of a tank.

The accumulator system of the present illustrative example may be formed, for example, of austenitic stainless steel, which is a generic term for ferrous alloys of iron with chromium, or of iron with chromium and nickel, with other minor additions, which alloys have a resistance to oxidizing types of corrosion. Alternatively, the tubes may also be formed from "Invar," which is a tradename of the Carpenter Steel Company of Reading, Pa., for low expansion alloys, including, in addition to iron, say 36% of nickel and minor amounts of carbon, magnesium, and silicon. Copper, aluminum, and any other metals suitable for cryogenic applications may also be used.

In order to provide extra heat insulation, if desired, the accumulator systems may be coated with gold 0.00005 in. thick, either by an evaporation process or by a chemical plating process, in a manner well-known in the art.

A possible theoretical explanation for the effectiveness of the embodiment just described in reducing thermal pressure oscillations, is that when oscillations arise in the fluid passing through the system from a cryogenic tank, a series of abrupt expansions in the pipe reduces the intenity of the wave which is ultimately transmitted, and simultaneously sets up a secondary system of waves which are reflected back through the cavities. The different dimensions of the successive accumulators and the location of the accumulators at the cold end where the tube is essentially isothermal avoids the possibility of the system being resonant to these secondary waves.

A further effect of the accumulators when placed at the cold, open end of the tube is to limit the distance up the temperature gradient that the cold reservoir gas is inducted into the pipe, thereby reducing the heat transfer potential to the gas, and hence restricting the driving force on the oscillations.

While the foregoing dimensions have been given to illustrate an optimum example of an accumulator system of the present invention, it will be understood that a system having a substantially different number and arrangement of accumulators of substantially different sizes and shapes, would also be operative for the purposes of the present invention. I have found, however, that for optimum results, the following guide lines may be observed in designing systems for the suppression of thermal oscillations:

(1) The diameters of the accumulators should at least exceed 2X, where X is the initial tube diameter.

(2) The accumulators should exceed X in length.

(3) The separation between accumulators should exceed X.

(4) For the reasons previously pointed out for optimum results, the accumulators are preferably placed close to the cold end, with the largest accumulator nearest thereto.

Referring to FIG. 3 of the drawings, there is shown a 500 liter container for storing liquid helium, which has been constructed to include, in addition to a conventional line for filling the container, a vent line for liquid, a vent line for gas, and a vapor-return line for refrigeration purposes, each of which has been formed to include a series of accumulators in accordance with the present invention.

The inner tank 10 is of general cylindrical form 23½ in. high and 36 in. in outer diameter with convex ends at the top and bottom. It is formed from stainless steel 0.075 in. thick and is constructed to withstand internal pressures of 40 lb./sq. in. absolute. This tank is supported in and surrounded concentrically by a radiation shield 11 of the same general shape, which has an outer diameter of 38 in., is 27 in. high, and is formed of copper 0.04 in. thick. The latter is encased in still another vessel 12 of similar shape, of stainless steel 3/16 in. thick, which is 42 in. in outer diameter and 29¾ in. high. Shield 11 and outer vessel 12 are held apart by conventional spacers, not shown. Between the outer stainless steel tank 12 and the copper shield 11 is interposed some type of highly efficient insulation. In the present embodiment this takes the form of aluminized polyethylene terephthalate (the latter known by the tradename "Mylar" of E. I. du Pont de Nemours and Company). Barriers of "Mylar" ¼ mil thick which have been aluminized on one side fills the space between 11 and 12.

In the present illustrative system, the lead-in pipe 14, adapted for filling the inner tank 10 with liquid helium, is of stainless steel, ¾ in. outer diameter, 0.042 in. thick, and 19½ in. long. This is inserted in a vertical position in the center of the convex top of the tank 10, and one end welded into place with a vacuum-tight seal. The pipe 14 passes vertically through openings in the copper shielding 11 and tank 12, and through a vacuum-tight seal in the disc 18, terminating at its upper end in a fluid-tight stopper 15.

The outer tank 12 has an integrally formed cylindrical extension 13, which is 8 in. outer diameter and 15⅜ in. long, comprising stainless steel 0.065 in. thick, and which is concentrically disposed around lead-in pipe 14. It is covered by an 8 in. diameter stainless steel disc top 18, which is welded onto the outer periphery of extension 13. In the top 18 are supported, in vacuum-tight seals, in addition to the termination of lead-in pipe 14, the valves 16 and 17, which will be discussed presently. A fluid-tight outer covering 30, which is 36 in. outer diameter and 19 in. high, of stainless steel 0.062 in. thick, is also provided to cover the stopper 15 and valves 16 and 17 when not in use.

Inserted into the body of the inner tank 10, which for the purposes of the present exposition we may assume to be partly filled with liquid helium to a level 20, is a liquid vent pipe 21, fashioned in accordance with the teachings of the present invention to include a system of accumulators for suppressing thermally induced pressure oscillations. The latter is completely encased in a vacuum jacket 8 which communicates with the evacuated space surrounding the tank 10. The vacuum jacket 8 is of stainless steel 2¾ in. diameter and 35 in. high, and is vacuum-sealed at its upper end into an opening in the inner tank 10, and at its lower end to the outside of conduit 22, just below the bottom accumulator 23.

In the present example, the accumulator assemblage is formed of austenitic stainless steel 0.047 in. thick, and extends in a vertical direction, parallel with the principal axis of the inner tank 10 to a point about ½ in. above the floor of the tank, an overall length of 37 in. The basic conduit 22, which is ½ in. outer diameter, is mitered at the bottom to expedite liquid intake, and prevent the tube from being placed against the bottom of the tank. Open-ended pipe 22 extends 2 in. below the bottom accumulator 23, and is held in position by a tripod support. There are two accumulators in this system, each 2 in. outer diameter, and each closed at the ends, except for the entrance and exit ports of the connecting pipes. The longest 23, which is 16 in. long, extends upward with its lower end centered on the upper end of conduit 22. Accumulator 23 is separated from accumulator 24 above it, which is 8 in. long, by 4 in. of conduit 25, the latter of the same cross-sectional dimension as 22.

From the top of accumulator 24, a length of pipe 26, also of the same cross-sectional diameter and type as conduits 22 and 25, passes out of vacuum jacket 8, and through shield 11, to an elbow connection 27, from which it leads through a vacuum-tight seal in outer tank 12. A 2½ in. diameter fitting 28, mounted on top of the outer tank 12, encloses the upper end of conduit 26 in a fluid-tight coaxial chamber which terminates in a vacuum-jacketed globe valve 29, which serves to control the evacuation of liquid helium from the tank.

Prior to operation of the system, the space between tanks 10 and 12, including the interiors of cylindrical extension 13 and the jacket 8, are evacuated to a level of less than about $10^{-5}$ mm. of mercury, through a conventional pumping system (not shown).

The helium vapor which boils up from the inside of the inner tank 10 during the storage period, passes part way up the pipe 14 and is led off through pipe 19 through a system of refrigeration coils comprising soft-tempered copper pipe having an outer diameter of ⅜ in., which surrounds and is soldered along its entire length of the outside of copper shield 11. The pipe 19 returns at its other end through a coil surrounding the lead-in pipe 14, and terminates in the bellows-sealed valve 16.

A second conduit system 31 serves as a pressure vent from the inner tank 10. In the present example, this is also formed of austenitic stainless steel 0.020 in. thick, and is disposed primarily in the evacuated space between the tank 10 and shield 11, with only the open terminal end 32 protruding through a vacuum-tight seal about ½ inch into the top of the inner tank 10. The latter comprises a tube ½ in. outer diameter which undergoes a nearly right angle bend to place the accumulator system in a substantially horizontal plane in the space between the inner tank 10 and shield 11. The accumulator chambers 33, 34, and 35 of this system are each 2 in. outer diameter, each pair being separated by a 2 in. length of conduit. The accumulator 33, nearest the cold terminal, is 8 in. long; the second, 34, is 6; and the third, 32, is 4. The conduit 36 leading out from accumulator 35 executes a 180° turn around the top of tank 10, passes through the shield 11, through a coil surrounding the lead-in conduit 14, terminating in the bronze circle-seal type relief valve 17, which is mounted in a vacuum-tight seal in the disc cover 18.

It will be apparent to those skilled in the art that prior to use the vessels and components are subjected to certain tests to determine their respective pressure responses. These include subjecting each of the vessels to gauge pressures ranging between 40 lb./sq. in and full vacuum. The valves are tested by gauge pressures up to 50 lb./sq. in. Each of the vessels and components described is cleaned in accordance with procedures well known in the art, subjected to a mass spectrometer test to determine a suitable level of impurities and vacuum tightness, and wrapped in polyethylene bags filled with nitrogen for storage prior to assemblage in the system of the present invention.

FIGURES 4A and 4B of the drawings show in front elevation, with a cut-away section and plan view respectively, a portion of a different embodiment of a system of the present invention, illustrating several variations from the showing of FIGURE 3, of the manner in which accumulator systems may be formed and used in configurations at least partially external to the inner tank, and designed to conform to its contour.

In FIGURES 4A and 4B, 10′ represents a very small section of a stainless steel inner storage vessel, designed to accommodate 1,000 liters of liquid helium, the lower terminal of the lead-in pipe being represented by 14′. The gas vent line 40 is designed so that its system of accumulators is located external to the inner tank 10′. This system is formed for example of stainless steel 0.047 in. thick, or of any of the other metals previously described as useful for the purposes of the present invention, and includes 3 hollow accumulators 43, 44, and 45, of general cylindrical form. It will be noted that the accumulators of the system presently described have been modified to include convex ends. The remaining section of tank 10′, not shown, will be assumed to be partly filled up with liquid helium.

The gas exhaust pipe 42, which is located at the cold end of the system inside of and near the top of inner tank 10′, is ½ in. over-all diameter. Pipe 42 passes through a vacuum-tight seal in tank 10′, and is connected to elbow joint 41, external to tank 10′. Pipe 49, also ½ in. over-all diameter, is connected to the other leg of elbow joint 41, and so directed that it forms a 60° angle with the Y-axis, in the plane of FIG. 4B. It connects to one end of accumulator 45, which is 2 in. outer diameter and 16 in. over-all length. About 7¼ in. from its cold end accumulator 45 is bent through an angle of 15° in the plane of FIG. 4B, to conform it more closely to the circular top of tank 10′. The other end of accumulator 45 is centered on and welded to the ½ in. outer diameter pipe 48. The latter, which extends a length of about 2 in. between accumulators 44 and 45, is bent through an angle of 30° in the plane of FIG. 4B, to conform to the circular top of the tank 10′. Accumulator 44, which is 2 in. outer diameter and 8 in. long, is centered on and has its ends welded between ½ in. pipes 47 and 48. Pipe 47, which is bent through an angle of 45° in the plane of FIG. 4B, has an over-all length of 4 in. It is welded to the end of accumulator 43, which similarly has an outer diameter of 2 in., and an over-all length of 4 in. Welded to the other end of accumulator 43 is the ½ in. lead-out pipe 46, which passes through the insulation and outer tanks through a vacuum seal, not shown, to suitable valve means.

Another modified form of system of the present invention is 55, also shown in FIGS. 4A and 4B of the drawings. This also includes 3 accumulators of cylindrical form, with convex ends, and is shaped to fit into a limited space. This combination comprises, for example, stainless steel 0.047 in. thick, or copper, or any other metal which has been described as suitable for the purposes of the present invention.

Vent pipe 56, which is located inside of the stainless steel inner tank 10′, has an outer diameter of ¼ in. It is connected axially to the end of cylindrical accumulator 57, which has an outer diameter of 1 in., and is 4 in. long. The section of the system inside of tank 10′ is insulated from the tank by wrapping with nylon cord. Accumulator 57 is connected for lead-out through conduit 58, ¼ in. outer diameter, and about 3 in. long, which passes through a vacuum-tight seal 61 in the wall of inner tank 10′. Conduit 60 of matching size, which continues out from the seal, is welded to the end of accumulator 61, 1 in. outer diameter and 3 in. long. Accumulator 61 is welded at its other end to horse-shoe conduit 62, also ¼ in. in cross-section, which is bent to execute a 180° bend in the plane of FIG. 4B. The other end of conduit 62 is welded to one end of accumulator 63, the other end of which is welded to conduit 64, which is ¼ in. outer diameter. Conduit 64 is parallel to conduit 60, the two conduits being spaced about 2 in. apart between their major axes. Conduit 64 leads out of the system through vacuum-tight seals in the insulation and outer tanks, to valve means, not shown.

It will be apparent from the foregoing that the principles of the present invention may be applied to many different types of cryogenic systems and to fluid systems generally; and may assume many different forms and shapes; and that the invention is not limited to any specific dimensions, form, or material shown herein by way of illustration.

I claim:

1. A transfer conduit adapted for evacuating cryogenic fluid from a heat-insulated container into a substantially warmer environment which comprises means for connecting an open end of said conduit into said container in a fluid-tight seal, a valve for closing off the flow of fluid at the warmer end of said conduit, said conduit comprising a plurality of pipe sections arranged in series to form a channel, and means for suppressing thermally induced pressure oscillations in said conduit when said valve is closed comprising a plurality of hollow pressure accumulators of substantially enlarged internal cross-section relative to said pipe sections interposed at spaced intervals along said channel and forming a part thereof.

2. A transfer conduit in accordance with claim 1 wherein each of said accumulators is spaced apart along said channel from the nearest adjacent accumulator by a pipe section having a length at least exceeding X, where X is the initial cross-sectional dimension of said pipe sections, and wherein each of said accumulators is of a different cubic capacity and has a length at least exceeding X in the direction of said channel.

3. A transfer conduit in accordance with claim 2 wherein each of said accumulators is cylindrical in form, of substantially uniform cross-sectional dimension at least exceeding 2X, and wherein said accumulators are respectively graduated in length along said channel with the longest disposed nearest to the colder end of said conduit.

4. A transfer conduit in accordance with claim 3 wherein each of said accumulators has a cross-sectional dimension approximating 4X, wherein said accumulators are spaced apart along said channel a distance approximating twice the cross-sectional diameter of said accumulator, and wherein the length of each succeeding accumulator, as measured along said channel in the direction of the colder end thereof, is substantially double the length of the preceding accumulator.

5. The combination in accordance with claim 4 wherein there are three said accumulators having respective lengths, as measured along said channel toward the colder end of said conduit, approximating 8X, 16X, and 32X.

6. In a system for storing cryogenic fluid which comprises in combination a heat-insulated inner container, and a vacuum-tight conduit connected with one of its ends communicating with the cold interior of said container through a vacuum-tight seal, and the other end of said conduit terminating in a substantially warmer environment, valve means operative for closing off said conduit at a position disposed in said warmer environment, said conduit comprising a plurality of pipe sections arranged in series to form a principal channel, a plurality of hollow pressure accumulators of substantially enlarged internal cross-section relative to said pipe sections spaced apart along the length of said channel and each disposed in contiguous end-to-end relationship with a successive pair of said pipe sections for suppressing thermally induced pressure oscillations in said conduit when said valve means is operated to close said conduit.

7. The combination in accordance with claim 6 wherein each of said pressure accumulators has a different cubical content, said accumulators being arranged in order decreasing in size along said conduit toward said warmer environment, and at least a portion of said accumulators disposed in a vacuum-insulated environment within said inner container.

8. A fluid conduit for transferring cyrogenic fluid from a cold environment to a warmer environment, means for closing off the flow of fluid at the warmer end of said conduit, and means for suppressing thermally induced pressure oscillations in said conduit when said means stops the flow of fluid comprising at least one section of conduit having a substantially enlarged cross-section, said cross-sectional dimension being approximately four times the diameter of said conduit.

References Cited
UNITED STATES PATENTS

| | | | |
|---|---|---|---|
| 2,951,348 | 9/1960 | Loveday et al. | 62—55 X |
| 3,130,555 | 4/1964 | Haettinger | 62—55 |
| 3,152,452 | 10/1964 | Bond et al. | 62—45 |

LLOYD L. KING, *Primary Examiner.*